Jan. 25, 1927.

A. MANCHESTER 1,615,592

CRANK HOLDER

Filed July 21, 1926

Inventor
Adam Manchester

By Clarence A. O'Brien
Attorney

Patented Jan. 25, 1927.

1,615,592

UNITED STATES PATENT OFFICE.

ADAM MANCHESTER, OF CENTRAL BRIDGE, NEW YORK.

CRANK HOLDER.

Application filed July 21, 1926. Serial No. 123,978.

This invention relates to a crank holding device for use in connection with internal combustion engines of tractors, automobiles, or the like, and principally for Fordson tractors for holding the handle cranks in a substantially elevated position so that the same will not encounter weeds, rocks, or other obstructions in the path of the tractor while the same is being operated, resulting in the bending of the crank to such an extent that the same cannot be used in the starting of the engine.

One of the main objects of the present invention is to substantially improve and simplify crank holders of this general character.

To the attainment of this end, the invention consists of a very simple device that may be readily applied by the operator of the tractor, and that is of such a nature as to permit of the ready attachment of the crank thereto when substantially elevated or to permit the release of the crank when it is desired to start the engine.

A still further object is to provide a crank holder of this character that is of such a nature that when the crank is released, the holding element per se will automatically move into position out of engagement with the crank so as not to interfere with the turning of the same in the starting of the engine.

Other objects will become apparent as the nature of the invention is better understood, the same comprising the novel form, combination, and arrangement of parts hereinafter more fully described, shown in the accompanying drawing and claimed.

In the drawing wherein like numerals indicate like parts:

Figure 1:
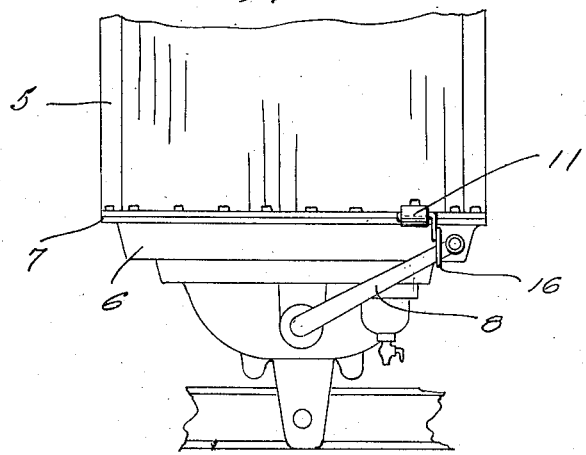
Figure 1 is a fragmentary front elevation of a Fordson tractor equipped with my improved crank holder.

Referring to the drawings, the numeral 5 designates the radiator of a tractor, such as a Fordson, embodying the usual lower shell or casing 6 having a forward horizontal flange 7. The engine starter crank of the tractor is designated by the reference character 8.

Figure 2:
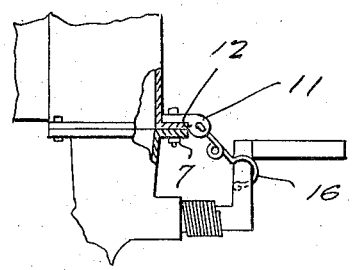
Figure 2 is a fragmentary view partly in side elevation and partly in cross section of the tractor disclosing the holder in actual use.
Figure 3:
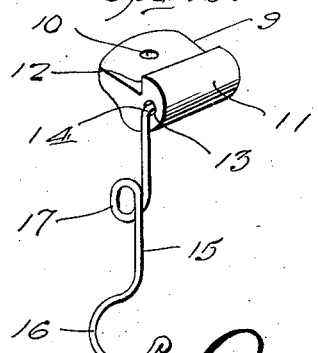
Figure 3 is an inverted perspective of the holder per se.

My invention per se constitutes the provision of a bracket 9 in the form of a metallic plate like casting that is formed at its inner longitudinal edge with an opening 10 as to permit the bracket to be secured upon the flange 7 by reason of one of the bolt connections passing therethrough as clearly indicated in both Figures 1 and 2. The width of this casting is greater than the width of the flange 7 so as to project slightly therebeyond, the projecting portion of the bracket being enlarged as at 11 for providing a shoulder 12 upon the under side of the casting which shoulder abuts the forward edge of the flange 11 to prevent the same from turning on its connection.

Extending longitudinally through the enlarged projecting edge of the bracket is an opening 13 through which extends the upper horizontally bent end 14 of a hanger arm 15 that is constructed of a single length of heavy wire so bent at its lower end as to provide a hook 16 for receiving the crank 8 of the tractor engine when the same is swung upwardly to the position disclosed in both Figures 1 and 2, it being of course understood that the bracket 9 is so positioned upon the flange 7 of the tractor radiator as to permit of the proper hooking of said crank handle.

The wire forming the arm 15 is so bent intermediate its ends as to provide a loop 17 in order that the length of the arm may be increased or diminished with the end in view of permitting the crank handle 8 to be supported in the desired raised position.

It will thus be seen that I have provided a highly novel, simple, and efficient form of crank holder for tractors, particularly of the Fordson type, that is well adapted for all the purposes heretofore designated even though I have herein shown and described the invention as consisting of certain detail structural elements, it is nevertheless to be understood that some changes may be made therein without affecting the spirit and scope of the appended claims.

Having thus described the invention, what I claim as new and desire to secure by Letters Patent is:—

1. In a crank holder for tractors, a bracket for disposition upon the top side of the tractor radiator flange at one side of the crank, said bracket having an opening at its inner end to permit of its attachment to the flange by one of the usual flange retaining bolts, a shoulder in the forward edge of the bracket for engagement over the forward edge of the flange to prevent the turning of the bracket, and an arm pivoted at one end to the forward edge of the bracket and having a hook in its lower end for receiving the crank when the same is partially elevated.

2. In a crank holder for tractors, a bracket for disposition upon the top side of the tractor radiator flange at one side of the crank, said bracket having an opening at its inner end to permit of its attachment to the flange by one of the usual flange retaining bolts, a shoulder in the forward edge of the bracket for engagement over the forward edge of the flange to prevent the turning of the bracket, an arm pivoted at one end to the forward edge of the bracket and having a hook in its lower end for receiving the crank when the same is partially elevated, said arm being in the form of a length of heavy wire so bent intermediate its ends as to provide a loop whereby the length of the arm may be increased or diminished.

In testimony whereof I affix my signature.

ADAM MANCHESTER.